(12) United States Patent
Zhang

(10) Patent No.: US 9,060,109 B2
(45) Date of Patent: Jun. 16, 2015

(54) NON-HANDHELD HIGH-DEFINITION DIGITAL VIDEO CAMERA

(75) Inventor: Xianzhi Zhang, Shenzhen (CN)

(73) Assignee: SHENZHEN AEE TECHNOLOGY CO., LTD., Shenzhen (CN)

( * ) Notice: Subject to any disclaimer, the term of this patent is extended or adjusted under 35 U.S.C. 154(b) by 936 days.

(21) Appl. No.: 13/244,250

(22) Filed: Sep. 23, 2011

(65) Prior Publication Data

US 2012/0176470 A1    Jul. 12, 2012

(30) Foreign Application Priority Data

Jan. 11, 2011   (CN) .......................... 2011 1 0004833

(51) Int. Cl.
*H04N 5/232* (2006.01)
*H04N 5/225* (2006.01)

(52) U.S. Cl.
CPC ......... *H04N 5/2252* (2013.01); *H04N 5/23203* (2013.01)

(58) Field of Classification Search
CPC .................. H04N 5/2252; H04N 5/23203
USPC ........................................ 348/36, 220, 222.1
See application file for complete search history.

(56) References Cited

U.S. PATENT DOCUMENTS 5,014,079 A * 5/1991 Hoshino et al. ................. 396/59
5,162,832 A * 11/1992 Kakita et al. ..................... 396/59
2003/0160862 A1 * 8/2003 Charlier et al. ............ 348/14.08
2004/0208492 A1 * 10/2004 Oguro ........................... 386/117
2005/0091110 A1 * 4/2005 Hentz et al. ...................... 705/14
2006/0209195 A1 * 9/2006 Goto ........................... 348/219.1
2010/0053421 A1 * 3/2010 Chan ............................. 348/373
2010/0295960 A1 * 11/2010 Furlan et al. ................ 348/222.1
2011/0199482 A1 * 8/2011 Morgan ........................ 348/143
2011/0286729 A1 * 11/2011 Gallagher et al. ............... 396/52

FOREIGN PATENT DOCUMENTS

CN   101631195 A   1/2010
CN   201699828 U   1/2011

OTHER PUBLICATIONS

1st Office Action of Chinese Patent Application No. 201110004833.1 issued by Chinese Patent Office.

* cited by examiner

*Primary Examiner* — Sath V Perungavoor
*Assistant Examiner* — Peter D Le

(57) ABSTRACT

A non-handheld high-definition (HD) digital video camera is disclosed, comprising a thin-film transistor (TFT) display module, a backup battery module, an audio & video (AV) transmission module and a video camera body. Each of the TFT display module, the backup battery module and the AV transmission module is detachably connected with the video camera body; a multifunctional interface is disposed at the bottom of the video camera body to electrically connect with the TFT display module, the backup battery module or the AV transmission module; a wide-angle lens is disposed at the top of the video camera body for forming an image on the TFT display module during operation; the video camera body is further provided with a memory module and a control module.

20 Claims, 3 Drawing Sheets

NON-HANDHELD HIGH-DEFINITION DIGITAL VIDEO CAMERA

BACKGROUND OF THE INVENTION

1. Technical Field

The present invention relates to the technical field of video cameras, and more particularly, to a non-handheld high-definition (HD) digital video camera.

2. Description of Related Art

A non-handheld camera means a portable digital video camera that needs not to be held by hands. Currently, with continuous development and advancement of technologies, non-handheld miniaturized video cameras are finding more and more applications, for example, in taking evidence in law enforcement, in outdoor sport applications and in on-board monitoring applications.

Most of handheld video cameras currently available in the market acquire audio & video (AV) data from the ambient by use of a standard lens and save the AV data in a memory card. Then, when it is desired to watch the AV file at a high definition, the memory card has to be connected to an external AV processing apparatus. Accordingly, these conventional video cameras are inconvenient to operate and have a narrow imaging range; furthermore, they also have a poor extensibility.

BRIEF SUMMARY OF THE INVENTION

A primary objective of the present invention is to provide a non-handheld high-definition (HD) digital camera having an improved extensibility, which is intended to have an enlarged imaging range, enhanced convenience in operation and an improved functional extensibility.

The present invention provides a non-handheld high-definition (HD) digital video camera, comprising a thin-film transistor (TFT) display module, a backup battery module, an audio & video (AV) transmission module and a video camera body. Each of the TFT display module, the backup battery module and the AV transmission module is detachably connected with the video camera body; a multifunctional interface is disposed at the bottom of the video camera body to electrically connect with the TFT display module, the backup battery module or the AV transmission module; a wide-angle lens is disposed at the top of the video camera body for forming an image on the TFT display module during operation; the video camera body is further provided with a memory module and a control module. The memory module is configured to store video or image data captured by the wide-angle lens and, under the control of the control module, output the video or image data to the TFT display module; and the control module comprises touch buttons disposed to the right of the TFT display module and on a side of the video camera body to allow for input of control instructions for controlling the wide-angle lens, the TFT display module and the memory module.

Preferably, a catching groove is formed at the bottom of the video camera body to be spaced apart from the multifunctional interface; a catching hook is disposed on a side of each of the TFT display module, the backup battery module and the AV transmission module that makes contact with the bottom of the video camera body, and the catching hook engages with the catching groove to connect each of the TFT display module, the backup battery module and the AV transmission module to the video camera body.

Preferably, the control module further comprises:

a sound controlled switch, being configured to switch the wide-angle lens from a sound controlled mode to a button operated mode or from the button operated mode to the sound controlled mode, wherein in the sound controlled mode, the digital video camera and the wide-angle lens can be activated by an external audio signal to work in an image-capturing status.

Preferably, the wide-angle lens has a pixel number ranging between 3 millions and 10 millions of CMOS and a viewing angle range of 100°~200°.

Preferably, the video camera body is further provided with a high-definition multimedia interface HDMI and a video output port AV OUT on a side of the video camera body, and the high-definition multimedia interface HDMI and the video output port AV OUT are electrically connected to the wide-angle lens and the control module respectively to output image and video data.

Preferably, the video camera body further comprises:

an audio recording module provided with a microphone so that audio information from the ambient is captured by the microphone and output to the memory module for storage.

Preferably, the video camera body is further provided with a USB data interface, the USB data interface is connected to the memory module and adapts to an external data processing apparatus for purpose of data interaction between the video camera and the external data processing apparatus and also for charging of the video camera.

Preferably, the control module is further provided with an infrared and/or wireless receiving module configured to receive an external infrared and/or wireless remote control signal for controlling turn-on/-off of the wide-angle lens.

Preferably, the control module further comprises:

a clock chip, being configured to display a time and to time an image capturing or audio recording operation; and a power level detecting sub-block disposed in a power supply circuit of the video camera, being configured to detect a power level of the video camera's battery.

Preferably, the video camera body is further provided with a self-timer indicator disposed at a periphery of the wide-angle lens, and the self-timer indicator is configured to generate an indication signal under the control of the control module so as to indicate a captured site aligned with the wide-angle lens and to indicate whether the capturing process has been completed.

The non-handheld HD digital video camera of the present invention has a multifunctional interface which is adapted to connect with a TFT display module, a backup battery module or an AV transmission module. Correspondingly, when the TFT display module is connected, multimedia information can be displayed; when the backup battery module is connected, the non-handheld digital video camera will be able to operate for a longer time period; and when the AV transmission module is connected, AV information acquired by the wide-angle lens and the microphone or information stored in the memory module can be transmitted to the outside, thus extending functions of the non-handheld video camera. Each of the modules is detachably connected to the video camera body, which enhances the convenience in operation and prolongs the time to use. Furthermore, the non-handheld HD digital video camera of the present invention further has a high-definition wide-angle lens having a large capturing view angle, so a wider range of high-definition video data or image data can be obtained to result in an extended imaging range and improved imaging quality. Because the control module can display the AV data on the TFT display module and, under the control of a sound or a remote control signal, control the turn-on or turn-off of the wide-angle lens, the convenience in operation of the non-handheld video camera is further enhanced.

DETAILED DESCRIPTION OF THE INVENTION

Figure 1:
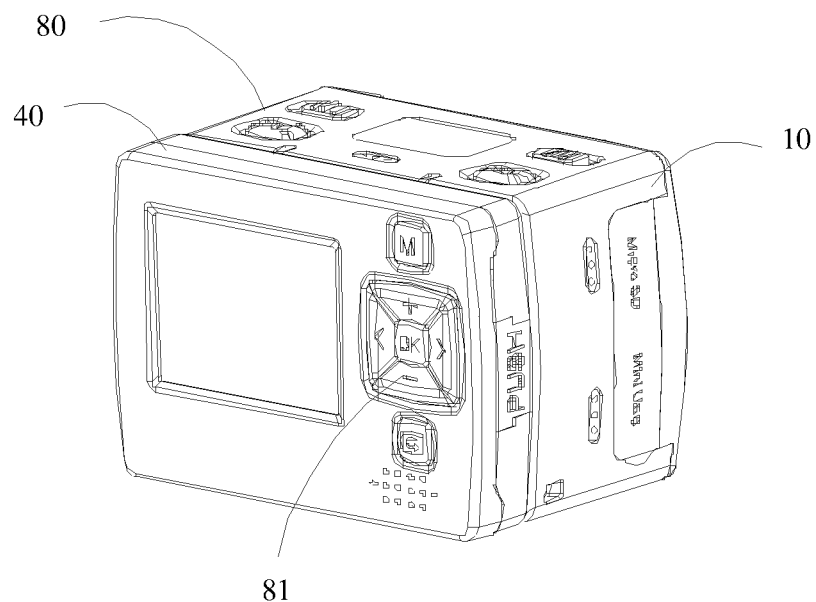
FIG. 1 is a schematic perspective structural view of a video camera body assembled with a TFT display module according to an embodiment of the present invention.

Hereinafter, means to achieve the objective, functional features and advantages of the present invention will be described with reference to embodiments thereof.

However, it shall be appreciated that, the embodiments described herein are only intended to illustrate but not to limit the present invention.

Referring to FIGS. 1 to 9, schematic structural views of a non-handheld high-definition (HD) digital video camera according to an embodiment of the present invention are shown therein. The non-handheld HD digital video camera comprises a thin-film transistor (TFT) display module 40, a backup battery module 50, an audio & video (AV) transmission module 60 and a video camera body 10. Each of the TFT display module 40, the backup battery module 50 and the AV transmission module 60 is detachably connected with the video camera body 10. A multifunctional interface 30 is disposed at the bottom of the video camera body 10 to electrically connect with the TFT display module 40, the backup battery module 50 and the AV transmission module 60. A wide-angle lens 20 is disposed at the top of the video camera body 10 to form an image on the TFT display module 40 during operation. The video camera body 10 is further provided with a memory module 70 and a control module 80. The memory module 70 is configured to store video or image data acquired by the wide-angle lens 20 and, under the control of the control module 80, output the video or image data to the TFT display module 40. The control module 80 comprises touch buttons 81 disposed to the right of the TFT display module 40 to allow for input of control instructions for controlling the wide-angle lens 20, the TFT display module 40 and the memory module 70.

The multifunctional interface 30 may be a plug-and-play interface, which is used to load a data transmission protocol and adapt to several kinds of connecting circuits so as to connect with the TFT display module 40 or the backup battery module 50 or the AV transmission module 60. Specifically, when the TFT display module 40 is connected, multimedia information can be displayed; when the backup battery module 50 is connected, the non-handheld HD digital video camera will be able to operate for a longer time period; and when the AV transmission module 60 is connected, AV information acquired by the wide-angle lens 20 and the microphone or information stored in the memory module 70 can be transmitted to the outside.

The detachable connection of the video camera body 10 with the TFT display module 40, the backup battery module 50 and the AV transmission module 60 may be accomplished through a catching structure. For example, in an embodiment, the video camera body 10 is formed at the top thereof with a catching groove 11, which is disposed to be spaced apart from the multifunctional interface 30. On a side of each of the TFT display module 40, the backup battery module 50 and the AV transmission module 60 that makes contact with the top of the video camera body 10 is disposed a catching hook 41 and a plug 42. The catching hook 41 is adapted to engage with the catching groove 11 so as to connect each of the modules to the video camera body 10. The plug 42 is adapted to engage with the multifunctional interface 30 and, when one of the modules is connected to the video camera body 10, also helps to position and fix the module.

In an embodiment, a threaded interface is also provided on a side surface of the video camera body 10 for connection with an external fixture. Because of the threaded interface, the non-handheld HD digital video camera of the present invention can adapt to a number of fixtures so as to extend the applications thereof.

In an embodiment, the non-handheld HD digital video camera of the present invention may also be provided with a water-proof enclosure which encloses the video camera to prevent entry of any liquid. This makes the non-handheld HD digital video camera of the present invention suitable for use in underwater operations.

As one of the best color display devices, the TFT display module 40 is able to display on-screen information at a high speed, a high luminance and a high contrast ratio. The TFT display module 40 connects with the video camera body through a multifunctional interface 30. The control module 80 may comprise a printed circuit board (PCB) disposed inside the video camera body 10. The PCB comprises a number of control circuits for connection with the wide-angle lens 20, the TFT display module 40 and the memory module 70 respectively. The control module 80 also has an embedded operation system loaded therein for intelligent operations. By means of the control module 80, the imaging pixel number, the resolution, the capturing angle or the like of the wide-angle lens 20 may be adjusted. Additionally, reviewing, playback, and deletion of an AV file can be achieved through use of the buttons 81 and the TFT display module 40 in combination. Furthermore, when a photo is to be printed from the non-handheld HD digital video camera of the present invention, the photo may be processed by the control module 80; for example, the Digital Prints groups Format (DPOF) is set for the photo so that it can be outputted to a printer.

The backup battery module 50 has a large-capacity battery and a power management circuit built therein, and may be used immediately after being plugged into the multifunctional interface 30 without having to power the video camera off and without interfering with operation of the video camera, which adds to great convenience in use.

Through the multifunctional interface 30, the AV transmission module 60 can transmit the information acquired by the video camera or information stored in the memory module to the outside for use by a remote terminal or some other device.

Figure 2:
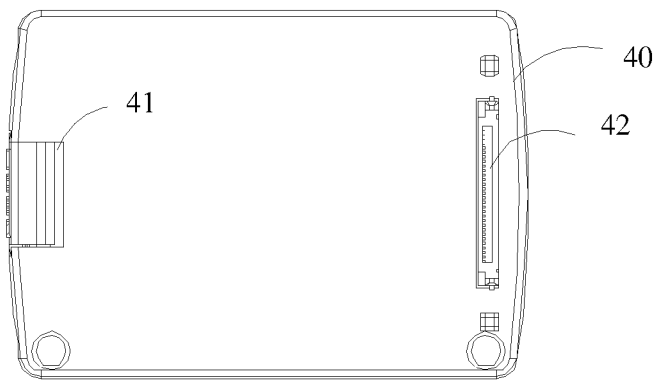
FIG. 2 is a front view of the TFT display module shown in FIG. 1.
Figure 3:
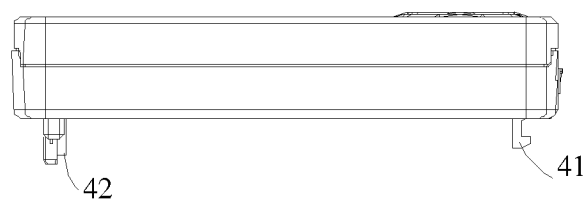
FIG. 3 is a bottom view of the TFT display module shown in FIG. 1.

For structures that connect the backup battery module 50 and the AV transmission module 60 to the video camera body 10, reference may be made to the embodiment shown in FIG. 2 and no further description will be made again herein.

Figure 4:
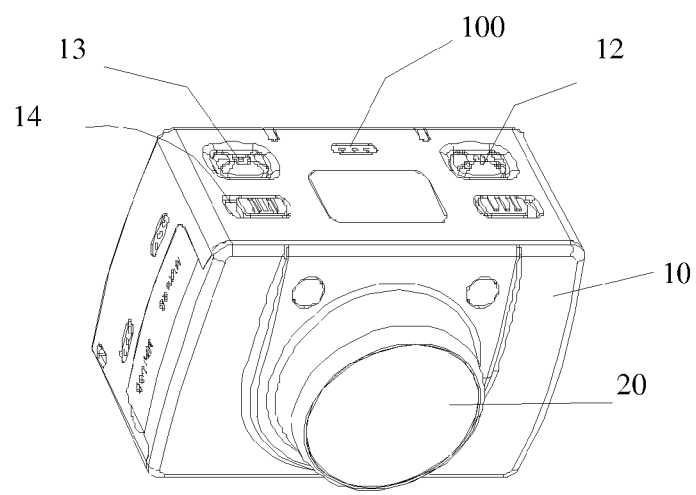
FIG. 4 is a schematic perspective structural view of the video camera body shown in FIG. 1.
Figure 5:
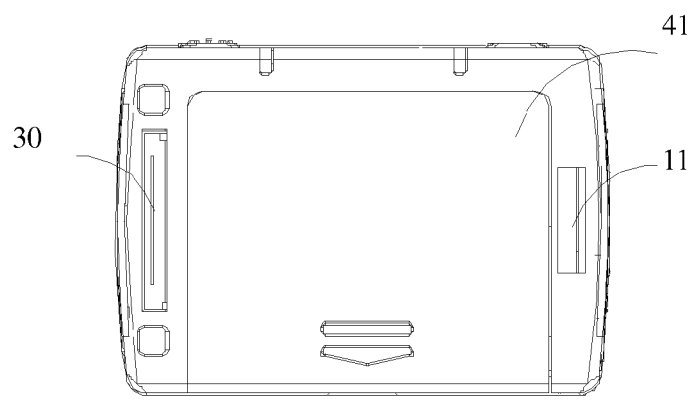
FIG. 5 is a rear view of the video camera body shown in FIG. 1.
Figure 6:
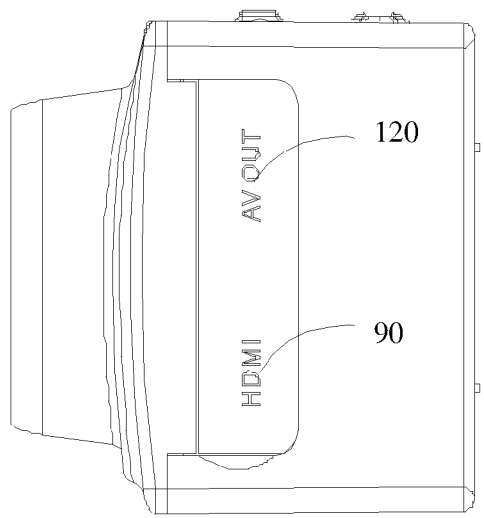
FIG. 6 is a right-side view of the video camera body shown in FIG. 1.
Figure 7:
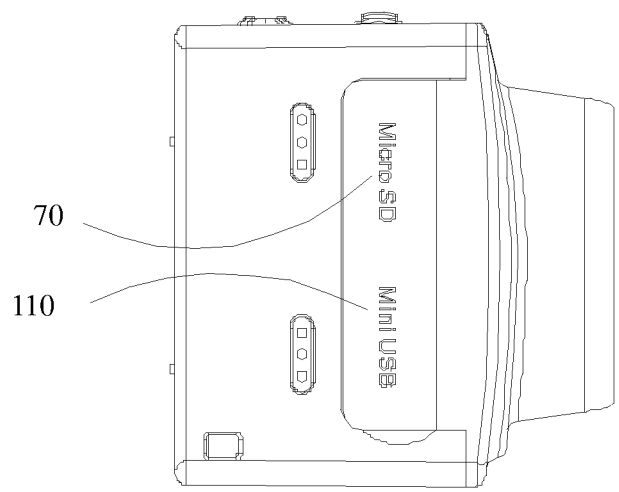
FIG. 7 is a left-side view of the video camera body shown in FIG. 1.
Figure 8:
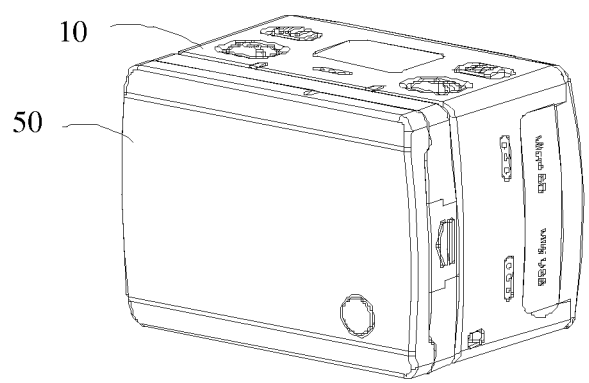
FIG. 8 is a schematic structural view of a video camera body assembled with a backup battery module according to an embodiment of the present invention.
Figure 9:
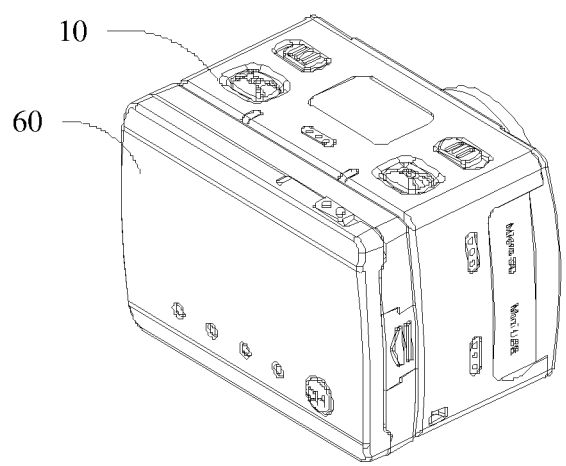
FIG. 9 is a schematic structural view of a video camera body assembled with an AV transmission module according to an embodiment of the present invention.

There are several ways to switch on and off the wide-angle lens 20. Referring to FIG. 4, a video recording button 12 and a capturing button 13 are disposed on a side of the video camera body 10 in an embodiment. The video recording button 12 and the capturing button 13 are connected to the circuit for controlling the wide-angle lens 20 on the PCB, and when the video recording button 12 or the capturing button 13 is pressed, the wide-angle lens 20 is activated to enter an operational status.

Referring to FIG. 4, a sound controlled switch 14 may be disposed on the other side of the video camera body 10 in another embodiment. The sound controlled switch 14 is adapted to receive an audio signal from the outside and output the audio signal to the PCB. Once the audio signal reaches a certain level, the PCB controls the wide-angle lens 20 to be activated to enter the operational status. In an embodiment for example, once the ambient sound level goes higher than 65 dB while the video camera is powered on, the wide-angle lens 20 will enter the video recording mode for video recording; and in a preview status, if the ambient sound level becomes lower than 65 dB for two minutes, then the memory module 70 will save the video recording file automatically; and if the ambient sound level then goes higher than 65 dB again in the preview status, the wide-angle lens 20 will again enter the video recording mode for video recording. If the video camera is to be powered off in the video recording status, the sound controlled switch 14 shall be set to the OFF status firstly and the data can be saved automatically by the memory module 70.

Additionally, in the non-handheld HD digital video cameral according to the present invention, the control module 80 is further provided with an infrared and/or wireless receiving module adapted to receive an external infrared and/or wireless remote signal, and turns on or off the wide-angle lens 20 according to the infrared and/or wireless remote signal. In an embodiment, a remote controller capable of outputting different signals may be provided to control the wide-angle lens 20; for example, a remote controller having functions of taking a photo, taking video images and stopping may be provided. In use of this remote controller, a coding operation must be performed between the remote controller and the control module 80 in a power-on status (e.g., by pressing some buttons of the remote controller simultaneously within a few seconds). Upon completion of the coding operation, remote control operations can be carried out by use of corresponding buttons within an effective range.

The pixel number and the imaging range of the wide-angle lens 20 may be set depending on practical applications or the user's requirements. For example, in an embodiment, the pixel number of the wide-angle lens 20 may be set to be 3 millions of CMOS; in another embodiment, the pixel number of the wide-angle lens 20 may be set to be 5 millions of CMOS; and in a further embodiment, the pixel number of the wide-angle lens 20 may be set to be 10 millions of CMOS. In an embodiment, the viewing angle of the wide-angle lens 20 may be set to be 100°; in another embodiment, the viewing angle of the wide-angle lens 20 may be set to be 160°; and in a further embodiment, the viewing angle of the wide-angle lens 20 may be set to be 300°.

The wide-angle lens 20 may be controlled by a switch disposed in the control module 80. In an embodiment, the switch may be a switching circuit disposed in the PCB so that the switching operation is accomplished by use of a button and the operation system in combination.

As shown in FIG. 4, the non-handheld HD digital video camera of the present invention is further provided with an audio recording module 100. The audio recording module 100 is configured to acquire an audio signal from the outside through the microphone and save the audio signal in the memory module 70. The operation status of the audio recording module 100 may be controlled by the control module 80; for example, an audio recording function may be achieved by use of the button 12 and the TFT display module 40 together.

The memory module 70 may include an SD card or a memory chip disposed on the PCB, and is configured to output the AV file to, for example, the TFT display module 40, a high-definition multimedia interface (HDMI) 90, a USB data interface 110 or an AV OUT interface 120 under the control of control instructions from the control module.

The HDMI 90 is able to transmit audio signals and video signals simultaneously. By transmitting audio signals and video signals through a same cable, installation of the system is significantly simplified. In an embodiment of the present invention, the HDMI 90 is disposed on a side of the video camera body 10 and is configured to transmit AV files from the wide-angle lens 20 and AV files stored in the memory module 70.

The AV OUT interface 120 connects to the control module 80 and the memory module 70 respectively, and is able to connect to an external image processing apparatus and output AV files from the memory module 70 to a computer or a TV set. Moreover, in an embodiment of the present invention, the control module 80 may also be configured to set the format (e.g., NTSC or PAL) of a TV set so as to adapt to users in different areas.

The USB data interface 110 connects to the memory module 70 and adapts to an external data processing apparatus for purpose of data interactions between the non-handheld HD digital video camera of the present invention and the external data processing apparatus and also for charging of the video camera. For example, upon completion of video recording or taking a photo, the AV data may be copied through the USB data interface 110 to a computer or TV set for reviewing.

The USB data interface 110 has a function of charging. In an embodiment, a power supply module of the non-handheld HD digital video camera includes a rechargeable lithium cell which can connect to an external data processing apparatus or a power supply via the USB data interface 110 to get electric power therefrom, thus accomplishing the purpose of charging.

In an embodiment, the non-handheld HD digital video camera of the present invention further comprises a self-timer indicator disposed at a periphery of the wide-angle lens 20 to generate an indication signal under the control of the control module 80. The indication signal is used to indicate a site with which the wide-angle lens 20 is aligned when the user is using the self-timer function. For instance, in a concrete example, when a user chooses the self-timer function, the self-timer indicator emits a light beam to indicate a site with which the wide-angle lens 20 is aligned, and this makes it convenient for the user to take a photo with the self-timer function.

To avoid loss of the files stored or damage of the video camera due to extreme environmental conditions, an environment detection unit is further provided in the control module 80. The environment detection unit comprises a temperature sensor and a humidity sensor adapted to detect the temperature and/or humidity of the working environment and send the detection results to the control module 80 so that operation statuses of other parts can be controlled by the control module 80. For example, in an embodiment, an operation temperature of the video camera may be preset by the control module 80 to be −10°~60°, and in case the temperature goes out of this range, the video camera will stop working. In practical applications, if the temperature sensor in the environment detection unit detects that the real-time temperature exceeds or is close to an operating temperature limit, then the control module 80 disconnects the operating circuit to stop operation of the video camera, thus avoiding damage to the video camera due to the abnormal ambient temperature. In another embodiment, a humidity value of 15~85% RH for the working environment may be preset in the control module 80, and in case the humidity exceeds this range, the video camera will stop working. The humidity of the ambient environment may be detected by the humidity sensor in the environment detection unit.

More preferably, the control module 80 may further comprise a clock chip, a power level detecting sub-block or the like. The clock chip may be a real-time clock (RTC), and is configured to display a time on the TFT display module 40 and to time an image capturing or sound recording operation. The power level detecting sub-block is disposed in a power supply circuit of the video camera to detect the power level for displaying purpose.

Further, the non-handheld HD digital video camera may further comprise a memory space detecting unit configured to detect a capacity of the memory unit so that the video camera performs better.

Arrangement of the clock chip, the power-level detecting sub-block and the memory space detecting unit can be readily accomplished by those of ordinary skill in the art and, thus, will not be further described herein.

What described above are only preferred embodiments of the present invention but are not intended to limit the scope of the present invention. Accordingly, any equivalent structural modifications that are made on basis of the specification and the attached drawings or any direct or indirect applications in other technical fields shall also fall within the scope of the present invention.

What is claimed is:

1. A non-handheld high-definition (HD) digital video camera, comprising a thin-film transistor (TFT) display module, a backup battery module, an audio & video (AV) transmission module and a video camera body, wherein each of the TFT display module, the backup battery module and the AV transmission module is detachably connected with the video camera body; a multifunctional interface is disposed at the bottom of the video camera body to electrically connect with the TFT display module, the backup battery module or the AV transmission module; a wide-angle lens imaging module is disposed at the top of the video camera body for forming an image on the TFT display module during operation; the video camera body is further provided with a memory module and a control module, and wherein the memory module is configured to store video or image data captured by the wide-angle lens imaging module and, under the control of the control module, output the video or image data to the TFT display module; the control module comprises touch buttons disposed to the right of the TFT display module and on a side of the video camera body to allow for input of control instructions for controlling the wide-angle lens imaging module, the TFT display module and the memory module; wherein
   the camera further comprises an environment detection unit adapted to detect a temperature and/or a humidity of a working environment of the camera and send detection results to the control module so that operation statuses of other parts are controlled by the control module; and
   the multifunctional interface is a plug-and-play interface configured to load a data transmission protocol and adapt to a variety of connecting circuits so as to connect with the TFT display module, the backup battery module, or the AV transmission module; and when the TFT display module is connected with the multifunctional interface, the TFT display module is configured to display multimedia information from the multifunctional interface; when the backup battery module is connected with the multifunctional interface, the non-handheld HD digital video camera is configured to be charged by the backup battery module; and when the AV transmission module is connected with the multifunctional interface, the AV transmission module is configured to transmit AV information acquired by the wide-angle lens imaging module and the microphone or information stored in the memory module to the outside.

2. The non-handheld HD digital video camera of claim 1, wherein a catching groove is formed at the bottom of the video camera body to be spaced apart from the multifunctional interface; a catching hook is disposed on a side of each of the TFT display module, the backup battery module and the AV transmission module that makes contact with the bottom of the video camera body, and the catching hook engages with the catching groove to connect each of the TFT display module, the backup battery module and the AV transmission module to the video camera body.

3. The non-handheld HD digital video camera of claim 1, wherein the control module further comprises:
   a sound controlled switch, being configured to switch the wide-angle lens imaging module from a sound controlled mode to a button operated mode or from the button operated mode to the sound controlled mode, wherein in the sound controlled mode, the digital video camera and the wide-angle lens imaging module can be activated by an external audio signal to work in an image-capturing status.

4. The non-handheld HD digital video camera of claim 3, wherein the wide-angle lens imaging module has a pixel number ranging between 3 millions and 10 millions of CMOS and a viewing angle range of 100°~200°.

5. The non-handheld HD digital video camera of claim 4, wherein the video camera body is further provided with a high-definition multimedia interface HDMI and a video output port AV OUT on a side of the video camera body, and the high-definition multimedia interface HDMI and the video output port AV OUT are electrically connected to the wide-angle lens imaging module and the control module respectively to output image and video data.

6. The non-handheld HD digital video camera of claim 5, wherein the video camera body further comprises:
   an audio recording module provided with a microphone so that audio information from the ambient is captured by the microphone and output to the memory module for storage.

7. The non-handheld HD digital video camera of claim 6, wherein the video camera body is further provided with a USB data interface, the USB data interface is connected to the memory module and adapts to an external data processing apparatus for purpose of data interaction between the video camera and the external data processing apparatus and also for charging of the video camera.

8. The non-handheld HD digital video camera of claim 7, wherein the control module is further provided with an infrared and/or wireless receiving module configured to receive an external infrared and/or wireless remote control signal for controlling turn-on/-off of the wide-angle lens imaging module.

9. The non-handheld HD digital video camera of claim 8, wherein the control module further comprises:
   a clock chip, being configured to display a time and to time an image capturing or audio recording operation; and a power level detecting sub-block disposed in a power supply circuit of the video camera, being configured to detect a power level of the video camera's battery.

10. The non-handheld HD digital video camera of claim 9, wherein the video camera body is further provided with a self-timer indicator disposed at a periphery of the wide-angle lens imaging module, and the self-timer indicator is configured to generate an indication signal under the control of the control module so as to indicate a captured site aligned with the wide-angle lens imaging module and to indicate whether the capturing process has been completed.

11. The non-handheld HD digital video camera of claim 2, wherein the control module further comprises:
    a sound controlled switch, being configured to switch the wide-angle lens imaging module from a sound controlled mode to a button operated mode or from the button operated mode to the sound controlled mode, wherein in the sound controlled mode, the digital video camera and the wide-angle lens imaging module can be activated by an external audio signal to work in an image-capturing status.

12. The non-handheld HD digital video camera of claim 1, wherein an operation temperature range of the camera is preset by the control module to be −10° C.~60° C., and when the environment detection unit detects that the temperature of the working environment of the camera exceeds the temperature range, the control module stops operation of the camera.

13. The non-handheld HD digital video camera of claim 1, wherein an operation humidity range of the camera is preset by the control module to be 15~85% RH, and when the environment detection unit detects that the humidity of the working environment of the camera exceeds the humidity range, the control module stops operation of the camera.

14. The non-handheld HD digital video camera of claim 1, wherein the backup battery module comprises a large-capacity battery and a power management circuit built therein, and is used immediately after being plugged into the multifunctional interface without having to power the video camera off and without interfering with operation of the camera.

15. The non-handheld HD digital video camera of claim 1, wherein the camera comprises a threaded interface on a side surface of the video camera body for connection with an external fixture.

16. The non-handheld HD digital video camera of claim 1, wherein the camera comprises a water-proof enclosure configured to enclose the camera to prevent entry of any liquid.

17. The non-handheld HD digital video camera of claim 1, wherein a plug is disposed on a side of each of the TFT display module, the backup battery module and the AV transmission module that makes contact with the top of the video camera body.

18. The non-handheld HD digital video camera of claim 1, wherein the AV transmission module is configured to transmit, through the multifunctional interface, information acquired by the video camera or information stored in the memory module to the outside for use by a remote terminal or other devices.

19. A non-handheld high-definition (HD) digital video camera, comprising a thin-film transistor (TFT) display module, a backup battery module, an audio & video (AV) transmission module and a video camera body, wherein each of the TFT display module, the backup battery module and the AV transmission module is detachably connected with the video camera body; a multifunctional interface is disposed at the bottom of the video camera body to electrically connect with the TFT display module, the backup battery module or the AV transmission module; a wide-angle lens imaging module is disposed at the top of the video camera body for forming an image on the TFT display module during operation; the video camera body is further provided with a memory module and a control module, and wherein the memory module is configured to store video or image data captured by the wide-angle lens imaging module and, under the control of the control module, output the video or image data to the TFT display module; the control module comprises touch buttons disposed to the right of the TFT display module and on a side of the video camera body to allow for input of control instructions for controlling the wide-angle lens imaging module, the TFT display module and the memory module; wherein
    the camera further comprises an environment detection unit adapted to detect a temperature and/or a humidity of a working environment of the camera and send detection results to the control module so that operation statuses of other parts are controlled by the control module; and
    a sound controlled switch disposed on a side of the video camera body and adapted to receive an audio signal, once an ambient sound level of the audio signal goes higher than 65 dB while the camera is powered on, the wide-angle lens imaging module enters a video recording mode for video recording; and in a preview status, if the ambient sound level becomes lower than 65 dB for two minutes, then the memory module saves a video recording file automatically; and if the ambient sound level then goes higher than 65 dB again in the preview status, the wide-angle lens imaging module enters the video recording mode again for video recording; if the camera is to be powered off in the video recording status, the sound controlled switch is set to the OFF status firstly and the data is saved automatically by the memory module.

20. A non-handheld high-definition (HD) digital video camera, comprising a thin-film transistor (TFT) display module, a backup battery module, an audio & video (AV) transmission module and a video camera body, wherein each of the TFT display module, the backup battery module and the AV transmission module is detachably connected with the video camera body; a multifunctional interface is disposed at the bottom of the video camera body to electrically connect with the TFT display module, the backup battery module or the AV transmission module; a wide-angle lens imaging module is disposed at the top of the video camera body for forming an image on the TFT display module during operation; the video camera body is further provided with a memory module and a control module, and wherein the memory module is configured to store video or image data captured by the wide-angle lens imaging module and, under the control of the control module, output the video or image data to the TFT display module; the control module comprises touch buttons disposed to the right of the TFT display module and on a side of the video camera body to allow for input of control instructions for controlling the wide-angle lens imaging module, the TFT display module and the memory module; wherein
    the multifunctional interface is a plug-and-play interface configured to load a data transmission protocol and adapt to a variety of connecting circuits so as to connect with the TFT display module, the backup battery module, or the AV transmission module; and when the TFT display module is connected with the multifunctional interface, the TFT display module is configured to display multimedia information from the multifunctional interface; when the backup battery module is connected with the multifunctional interface, the non-handheld HD digital video camera is configured to be charged by the backup battery module; and when the AV transmission module is connected with the multifunctional interface, the AV transmission module is configured to transmit AV information acquired by the wide-angle lens imaging module and the microphone or information stored in the memory module to the outside.

* * * * *